(12) United States Patent
Kim et al.

(10) Patent No.: US 11,002,046 B2
(45) Date of Patent: May 11, 2021

(54) HIGH OFFSET HOOK LATCH

(71) Applicant: HARTWELL CORPORATION, Placentia, CA (US)

(72) Inventors: Simon Jeongwoo Kim, Placentia, CA (US); Bo Dumitru Artin, Placentia, CA (US)

(73) Assignee: Hartwell Corporation, Placentia, CA (US)

( * ) Notice: Subject to any disclaimer, the term of this patent is extended or adjusted under 35 U.S.C. 154(b) by 1098 days.

(21) Appl. No.: 15/456,257

(22) Filed: Mar. 10, 2017

(65) Prior Publication Data

US 2017/0260782 A1    Sep. 14, 2017

Related U.S. Application Data (60) Provisional application No. 62/306,620, filed on Mar. 10, 2016.

(51) Int. Cl.

| | |
|---|---|
| *E05C 19/14* | (2006.01) |
| *B64D 29/06* | (2006.01) |
| *E05B 5/02* | (2006.01) |
| *E05B 13/00* | (2006.01) |
| *E05B 63/06* | (2006.01) |
| *E05B 41/00* | (2006.01) |
| *B64D 29/00* | (2006.01) |

(52) U.S. Cl.
CPC ............ *E05C 19/145* (2013.01); *B64D 29/06* (2013.01); *E05B 5/003* (2013.01); *E05B 13/002* (2013.01); *E05B 63/06* (2013.01); *B64D 29/00* (2013.01); *E05B 41/00* (2013.01); *Y10S 292/31* (2013.01); *Y10S 292/49* (2013.01); *Y10S 292/60* (2013.01); *Y10T 292/0871* (2015.04); *Y10T 292/0914* (2015.04); *Y10T 292/0917* (2015.04); *Y10T 292/216* (2015.04)

(58) Field of Classification Search
CPC ....... Y10T 292/08711; Y10T 292/2161; Y10T 292/0914; Y10T 292/0917; E05C 19/1451; E05B 5/003; E05B 13/002; E05B 63/06; E05B 41/00; B64D 29/06; B64D 29/00; Y10S 292/31; Y10S 292/49; Y10S 292/60

See application file for complete search history.

(56) References Cited

U.S. PATENT DOCUMENTS

| | | | |
|---|---|---|---|
| 2,904,141 | A | 9/1959 | Henrichs |
| 4,053,177 | A * | 10/1977 | Stammreich .......... E05C 19/145 |
| | | | 292/113 |
| 4,116,479 | A | 9/1978 | Poe |
| 4,159,137 | A * | 6/1979 | Richter ..................... E05C 3/08 |
| | | | 292/123 |
| 4,183,564 | A | 1/1980 | Poe |

(Continued)

FOREIGN PATENT DOCUMENTS

| | | |
|---|---|---|
| EP | 0839714 | 5/1998 |
| EP | 1091059 | 4/2001 |

(Continued)

*Primary Examiner* — Kristina R Fulton
*Assistant Examiner* — Faria F Ahmad
(74) *Attorney, Agent, or Firm* — Barnes & Thornburg LLP (57) ABSTRACT

A latch mechanism includes a hook, a displaceable handle, and links connected between the handle and hook for the operation of the latch mechanism. The handle and links cooperate with the hook to hold the latch mechanism in a locked position.

19 Claims, 6 Drawing Sheets

(56) References Cited

U.S. PATENT DOCUMENTS

| | | | |
|---|---|---|---|
| 4,318,557 A | 3/1982 | Bourne et al. | |
| 4,602,812 A | 7/1986 | Bourne | |
| 4,618,557 A | 10/1986 | Dan et al. | |
| 4,743,052 A * | 5/1988 | Stammreich | E05C 19/145 292/113 |
| 4,768,815 A * | 9/1988 | Harmon | E05C 19/145 292/113 |
| 4,828,299 A * | 5/1989 | Poe | E05B 63/128 292/139 |
| 4,858,970 A * | 8/1989 | Tedesco | E05C 19/145 292/113 |
| 4,877,274 A * | 10/1989 | Poe | E05B 15/0006 292/113 |
| 4,991,885 A * | 2/1991 | Poe | E05B 15/0006 292/108 |
| 5,152,559 A * | 10/1992 | Henrichs | B64D 29/06 292/113 |
| 5,445,422 A * | 8/1995 | Weinerman | E05C 19/14 292/247 |
| 5,620,212 A | 4/1997 | Bourne et al. | |
| 5,984,382 A | 11/1999 | Bourne et al. | |
| 6,279,971 B1 | 8/2001 | Dessenberger, Jr. | |
| 6,325,428 B1 * | 12/2001 | Do | B64D 29/06 244/129.4 |
| 6,343,815 B1 * | 2/2002 | Poe | E05C 19/145 292/113 |
| 7,066,501 B2 | 6/2006 | Meineke | |
| 8,573,934 B2 | 11/2013 | Soulier | |
| 8,864,185 B2 | 10/2014 | Do | |
| 8,864,189 B2 | 10/2014 | Fournie et al. | |
| 8,925,979 B2 * | 1/2015 | Hernandez | E05C 19/14 292/98 |
| 9,004,548 B2 * | 4/2015 | Joret | B64D 29/06 292/96 |
| 9,273,488 B1 * | 3/2016 | Yu | E05B 15/025 |
| 9,580,945 B2 | 2/2017 | Artin | |
| 9,617,767 B1 * | 4/2017 | Baic | E05C 3/162 |
| 9,677,306 B2 * | 6/2017 | DeFrance | B64D 29/06 |
| 10,173,782 B2 * | 1/2019 | Hernandez | B64D 29/06 |
| 10,443,279 B2 * | 10/2019 | Kim | E05B 13/002 |
| 2008/0129056 A1 | 6/2008 | Hernandez et al. | |
| 2009/0051170 A1 * | 2/2009 | Baic | E05B 15/0006 292/113 |
| 2011/0133489 A1 | 6/2011 | Hemeury et al. | |
| 2011/0174929 A1 | 7/2011 | Rowbut et al. | |
| 2011/0227350 A1 | 9/2011 | Do | |
| 2012/0102842 A1 * | 5/2012 | Fournie | E05C 19/145 49/503 |
| 2012/0151724 A1 * | 6/2012 | DeFrance | E05C 19/145 24/601.5 |
| 2013/0328326 A1 | 12/2013 | DeFrance | |
| 2015/0259957 A1 | 9/2015 | Hernandez | |
| 2016/0069118 A1 | 3/2016 | Artin | |
| 2017/0058583 A1 | 3/2017 | Kim et al. | |
| 2017/0260782 A1 | 9/2017 | Kim et al. | |

FOREIGN PATENT DOCUMENTS

| | | |
|---|---|---|
| EP | 1927711 | 6/2008 |
| EP | 2547848 | 8/2015 |

* cited by examiner

FIG. 12

HIGH OFFSET HOOK LATCH

CROSS REFERENCE TO RELATED APPLICATIONS

This application claims priority under 35 U.S.C. § 119(e) to U.S. Provisional Application Ser. No. 62/306,620, filed Mar. 10, 2016, which is expressly incorporated by reference herein.

FIELD OF THE DISCLOSURE

The present disclosure relates generally to a latch, and more specifically to a hook latch mechanism for use on aircraft.

BACKGROUND

Many types of latches are used in connection with aircraft to releasably secure two members or structures of the aircraft together in a closed position, such as the housing portions of an engine nacelle. Such latches are subjected to substantial forces during use while securing two aircraft members together in a closed position. Aircraft latches must also prevent inadvertent opening of the latch that could be caused by vibratory or other forces applied to the latch.

This background information is provided to provide some information believed by the applicant to be of possible relevance to the present disclosure. No admission is intended, nor is such an admission to be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

SUMMARY

A latch mechanism of the present disclosure solves various design problems associated with a single link latch used in a restricted space as well as other applications. The following disclosure relates to a latch mechanism for use in latching a first body to a second body. Such a latch mechanism could be used in an aircraft to latch a first panel or structure to a second panel or structure. The latch mechanism includes a hook, a displaceable handle, and links connected between the handle and hook for the operation of the latch mechanism.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying modes of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The terms herein should be broadly interpreted throughout this application to include all known as well as all hereafter discovered versions, equivalents, variations and other forms of the abovementioned terms as well as other terms. The present disclosure is intended to be broadly interpreted and not limited. For example, reference to a "rivet" includes rivets as well as other permanent or removable fasteners, such as screws, bolts, posts, pins, and plugs just to name a few.

Figure 1:
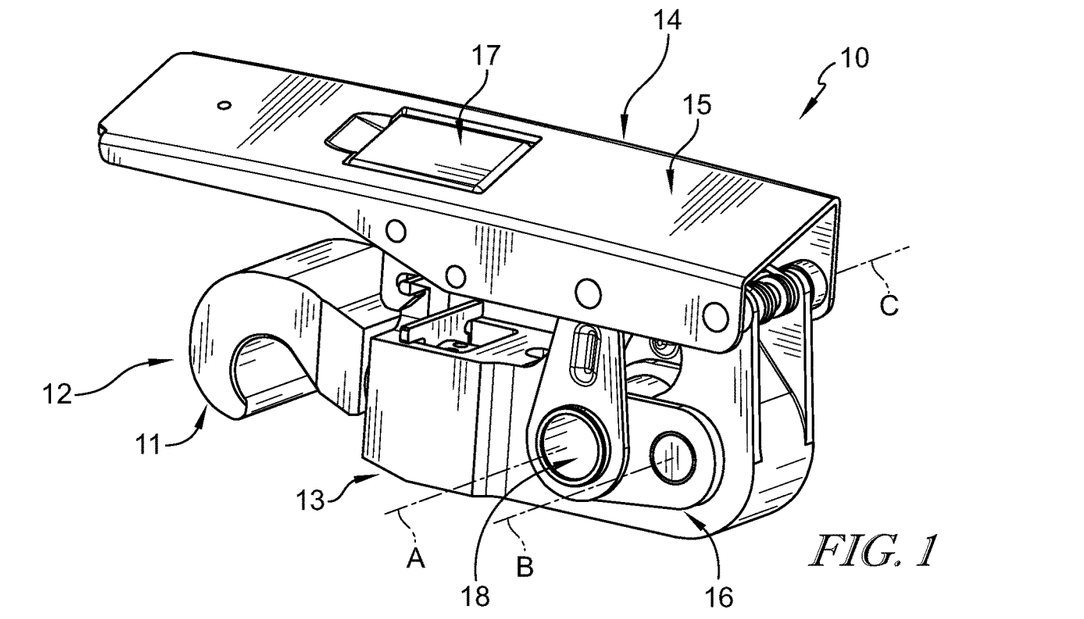
FIG. 1 is a perspective view of one embodiment of a latch mechanism in accordance with the present disclosure showing that the latch mechanism includes a hook, a displaceable handle, and links connected between the handle and hook and suggesting that the handle and links cooperate with the hook to hold the latch mechanism in a locked position.
Figure 2:
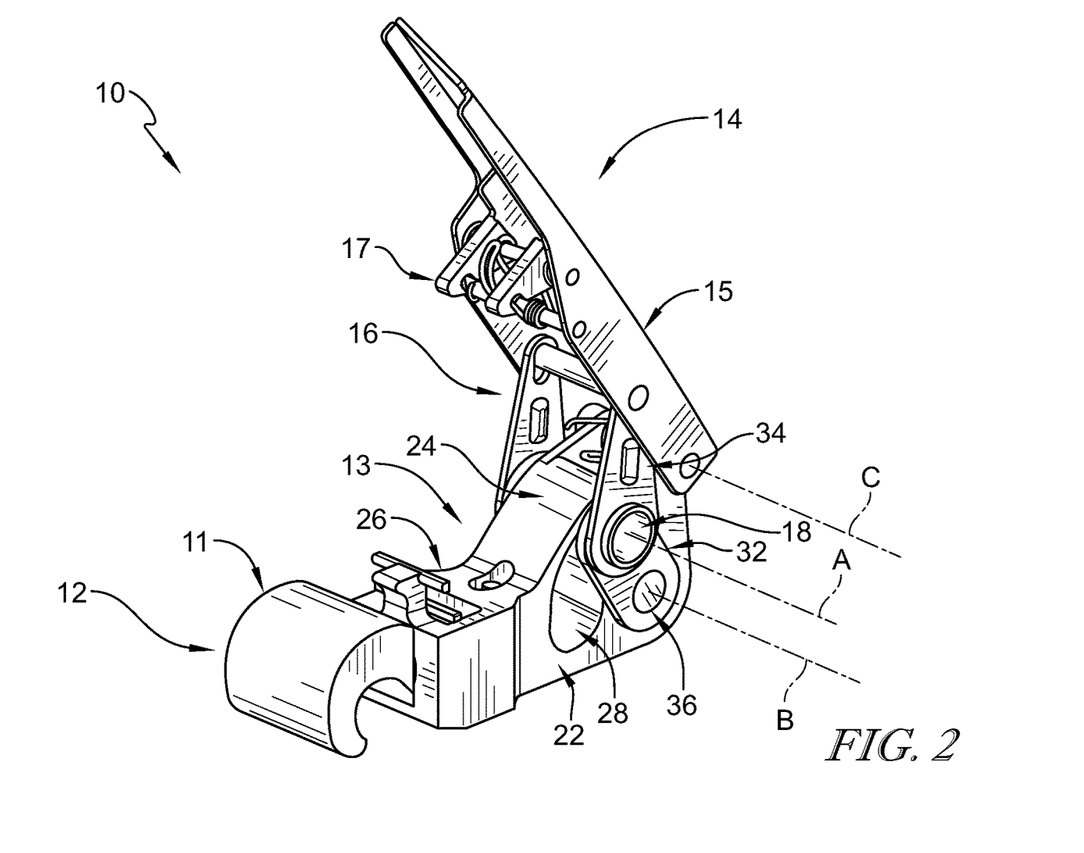
FIG. 2 is a view similar to FIG. 1 showing the latch mechanism in an unlocked position and suggesting that the handle moved from a closed position, as shown in FIG. 1, to an opened position as shown in FIG. 2.

An illustrative latch mechanism 10 in accordance with the present disclosure is shown in FIGS. 1 and 2. Latch mechanism 10 includes a hook 12, a handle 14, and a connecting linkage 16 coupled to hook 12 and handle 14. A mounting bushing 18 extends through latch mechanism 10 and is configured to receive a mounting bolt or other fastener to hold latch mechanism 10 to a component, such as a panel of an aircraft.

Hook 12 includes an adjustable hook end 11 and a hook body 13 as shown in FIGS. 1 and 2. Hook body 13 includes a primary arm 22, a bridge 24 coupled to arm 22, and a hook-end receiver 26 coupled to arm 22 and bridge 24 as shown in FIG. 2. Hook body 13 is also formed to define a generally vertically-extending, arcuate slot 28 extending between arm 22 and bridge 24. Bridge 24 cooperates with arm 22 to maximize the strength and durability of hook body 13.

Latch mechanism 10, including hook 12, is rotatable about an axis A extending through bushing 18 during opening and closing of latch mechanism 10 as suggested in FIGS. 1 and 2. Linkage 16 includes a load link 32 and an auxiliary link 34 as shown in FIG. 2. Load link 32 is coupled to mounting bushing 18 and to a rivet 36 for rotation about an axis B extending through rivet 36. Auxiliary link 34 is coupled to handle 14 and mounting bushing 18 to move mounting bushing 18 with handle 14. Handle 14 is rotatable about an axis C extending through latch mechanism 10 as suggested in FIGS. 1 and 2. Auxiliary link 34 provides clearance between handle 14 and hook 12 to allow handle 14 to be formed with a varying contour, as suggested in FIG. 1, to match with an outer contour of the component that latch mechanism 10 is attached to.

Figures 3, 4, 5:
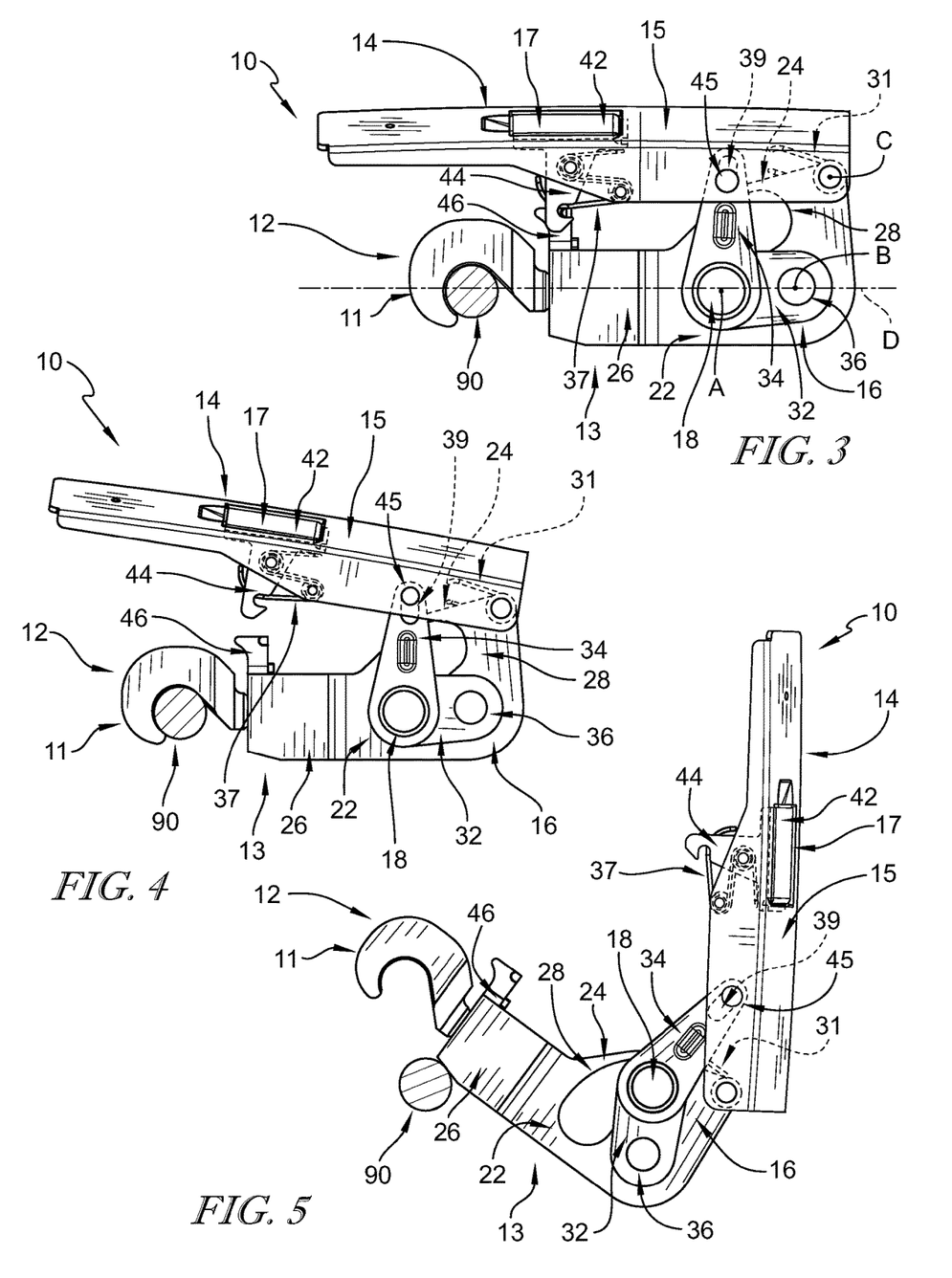
FIG. 3 is a side elevational view of the latch mechanism of FIG. 1 showing the hook engaged with a keeper and suggesting that the latch mechanism blocks movement of the keeper when the latch mechanism is in a locked position.
FIG. 4 is a view similar to FIG. 3 showing the handle moved from the closed position toward the opened position after a trigger of the handle is disengaged from the hook.
FIG. 5 is a view similar to FIG. 4 showing the handle moved to the opened position to disengage the hook from the keeper.

Handle 14 and linkage 16 control movement of hook 12 relative to a keeper 90 mounted on an adjacent component to the component that latch mechanism 10 is mounted to as suggested in FIGS. 3-5. Latch mechanism 10 is configured to block movement of keeper 90 away from mounting bushing 18 when latch mechanism 10 is in the closed position to hold adjacent components, such as panels of an aircraft, together at the selection of a user.

Latch mechanism 10 is shown in a locked position in FIG. 3. Handle 14 includes a frame 15 and a trigger 17 coupled to frame 15. Auxiliary link 34 engages with bushing 18 to hold bushing against arm 22 in slot 28 when handle 14 is in the locked position. Linkage 16 cooperates with hook 12 to provide an over-center arrangement where axis A through bushing 18 is offset from a centerline D (extending through axis B and keeper 90) toward arm 22.

Trigger 17 includes a button pad 42 and a catch 44 as shown in FIG. 3. Catch 44 engages with a retainer 46 coupled to hook body 13 to hold handle 14 in the closed position at the selection of a user. A user engages pad 42 to rotate trigger 17 relative to frame 15 such that catch 44 moves away from retainer 46 to disengage catch 44 from retainer 46.

A pop-up spring 37 engages with retainer 46 to rotate handle 14 about axis C when catch 44 is released from retainer 46 as suggested in FIG. 4. A rivet 45 extends through handle 14 and through an oblong opening 39 formed in auxiliary link 34. Opening 39 is configured to allow handle 14 to rotate from the locked position, shown in FIG. 3, to a pop-up position, shown in FIG. 4, without moving bushing 18 within slot 28. A user rotates handle 14 about axis C toward an opened position to move latch mechanism 10 to an unlocked position where hook end 11 is disengaged from keeper 90 to allow movement of keeper 90 as suggested in FIG. 5. As handle 14 rotates, bushing 18 moves in slot 28 and linkage 16 moves hook 12 relative to keeper 90. Movement of bushing 18 causes extension and retraction of hook end 11 relative to axis A due to the offset rotation axis B of load link 32. In the illustrative embodiment, a spring 31 biases handle 14 toward the opened position to assist a user in unlocking latch mechanism 10.

Figure 6:
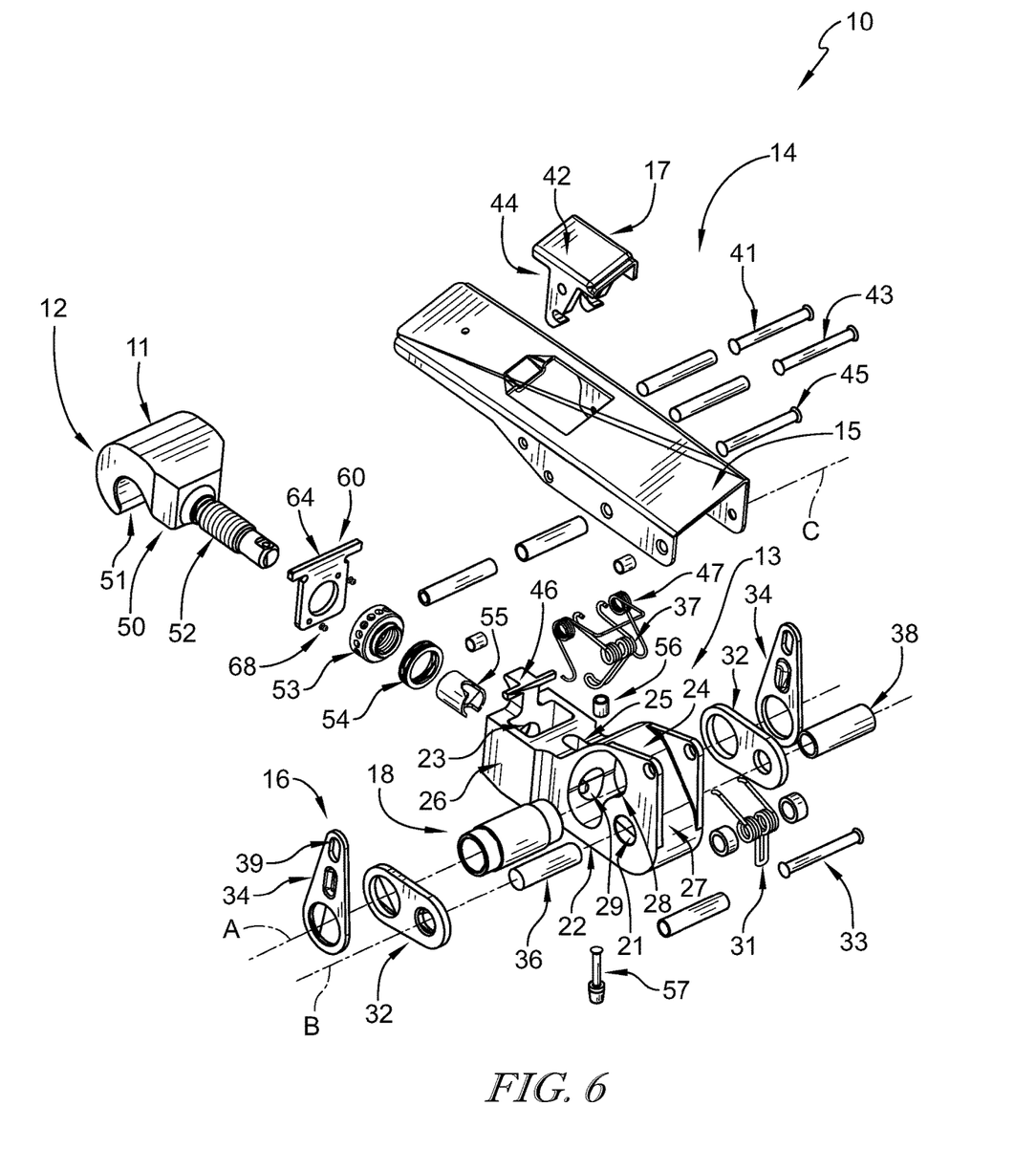
FIG. 6 is an exploded perspective view of the latch mechanism of FIG. 1.

An exploded assembly view of latch mechanism 10 is shown in FIG. 6. In the illustrative embodiment, linkage 16 includes load links 32 and auxiliary links 34 positioned on opposing sides of hook body 13. Bushing 18 extends into slot 28 and links 32, 34 engage with bushing 18 along axis A. Rivet 36 extends through a hole 21 formed through hook body 13 and engages with links 32, 34 along axis B to mount links 32, 34 for rotation about axis B. In some embodiments, a sleeve 38 is received in hole 21 between links 32 and around rivet 36.

A rivet 33 extends through frame 15 and through hook body 13 to mount handle 14 for rotation about axis C relative to hook 12 as suggested in FIG. 6. Spring 31 extends into a channel 27 of hook body 13 and rivet 33 couples spring 31 to hook body 13. Spring 31 biases handle 14 toward the opened position.

Trigger 17 is coupled to frame 15 by a rivet 41 as suggested in FIG. 6. A spring 47 is mounted on rivet 41 and engages with pad 42 and a rivet 43 to bias catch 44 toward retainer 46. Rivet 43 is also configured to mount pop-up spring 37 on handle 14.

Adjustable hook end 11 includes a head 50 and an adjuster 53 as shown in FIG. 6. Head 50 includes a grip 51 and a shaft 52 extending from grip 51. In the illustrative embodiment, shaft 52 is threaded and adjuster 53 engages with shaft 52 to move head 50 relative to hook body 13 when adjuster 53 is rotated. Adjuster 53 is received in a pocket 23 and shaft 52 extends into a bore 29 formed in hook body 13 to engage with adjuster 53. In some embodiments, hook end 11 is fixed relative to hook body 13 and not adjustable. In some embodiments, the position of keeper 90 is adjustable.

A pin 57 extends into a passage 25 of hook body 13 to engage with shaft 52 of head 50 as suggested in FIG. 6. A cap 56 engages with pin 57 to secure pin 57 to shaft 52. A cup 55 extends over an end of shaft 52 and engages with pin 57 and cap 56. Pin 57 and cap 56 move in passage 25 as head 50 is adjusted and are configured to limit travel of head 50 relative to hook body 13. Pin 57 and cap 56 engage with shaft 52 and hook-end receiver 26 to block rotation of head 50.

A spring assembly 60 and a spring washer 54 extend into pocket 23 with adjuster 53 as suggested in FIG. 6. Spring assembly 60 includes a mounting plate 64 and contacts 68 coupled to plate 64. In the illustrative embodiment, spring washer 54 engages with hook body 13 to bias adjuster 53 toward contacts 68 of mounting plate 64. Contacts 68 control rotation of adjuster 53.

Figure 7:
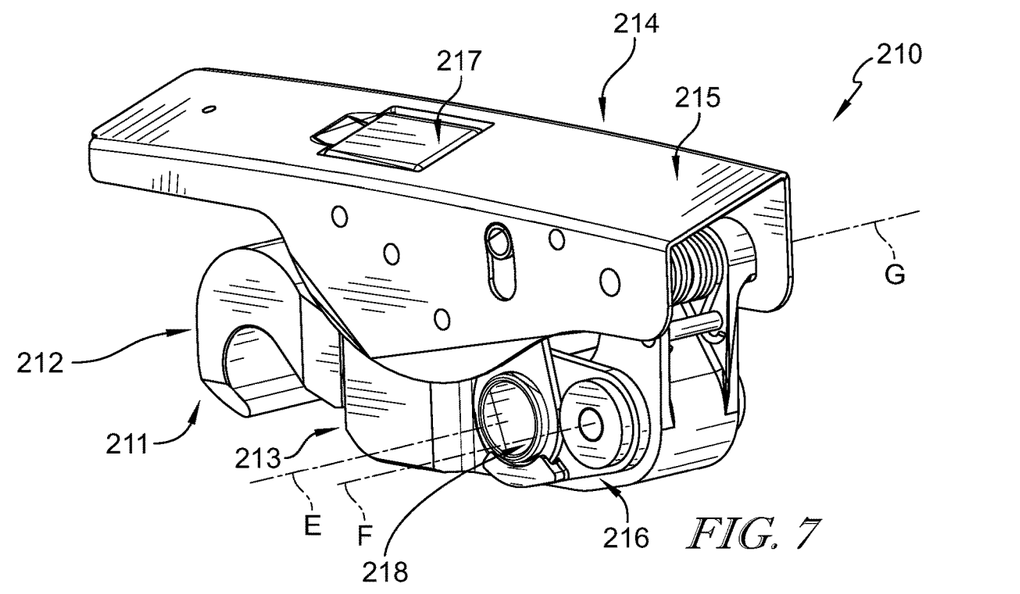
FIG. 7 is a perspective view of another embodiment of a latch mechanism in accordance with the present disclosure showing that the latch mechanism includes a hook, a displaceable handle, and links connected between the handle and hook and suggesting that the handle and links cooperate with the hook to hold the latch mechanism in a locked position.
Figure 8:
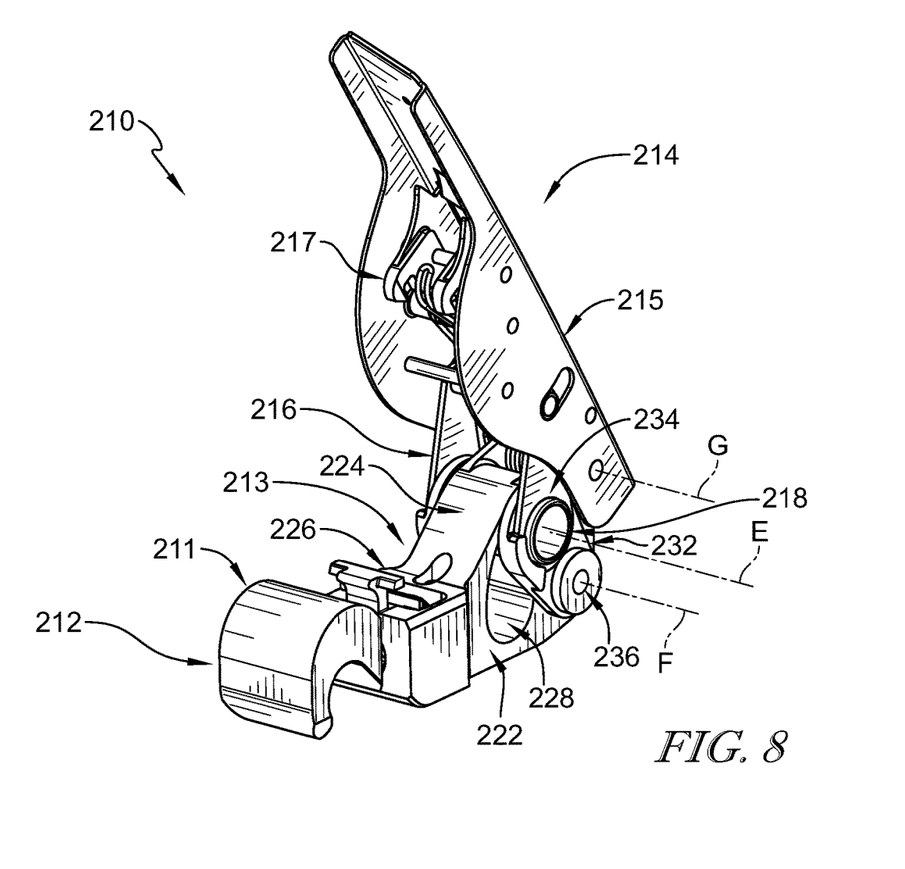
FIG. 8 is a view similar to FIG. 7 showing the latch mechanism in an unlocked position and suggesting that the handle moved from a closed position, as shown in FIG. 7, to an opened position as shown in FIG. 8.

Another embodiment of an illustrative latch mechanism 210 in accordance with the present disclosure is shown in FIGS. 7 and 8. Latch mechanism 210 includes a hook 212, a handle 214, and a connecting linkage 216 coupled to hook 212 and handle 214. A mounting bushing 218 extends through latch mechanism 210 and is configured to receive a mounting bolt or other fastener to hold latch mechanism 210 to a component, such as a panel of an aircraft.

Hook 212 includes an adjustable hook end 211 and a hook body 213 as shown in FIGS. 7 and 8. Hook body 213 includes a primary arm 222, a bridge 224 coupled to arm 222, and a hook-end receiver 226 coupled to arm 222 and bridge 224 as shown in FIG. 8. Hook body 213 is also formed to define a generally vertically-extending, arcuate slot 228 extending between arm 222 and bridge 224. Bridge 224 cooperates with arm 222 to maximize the strength and durability of hook body 213.

Latch mechanism 210, including hook 212, is rotatable about an axis E extending through bushing 218 during opening and closing of latch mechanism 210 as suggested in FIGS. 7 and 8. Linkage 216 includes a load link 232 and an auxiliary link 234 as shown in FIG. 8. Load link 232 is coupled to mounting bushing 218 and to a rivet 236 for rotation about an axis F extending through rivet 236. Auxiliary link 234 is coupled to handle 214 and mounting bushing 218 to move mounting bushing 218 with handle 214. Handle 214 is rotatable about an axis G extending through latch mechanism 210 as suggested in FIGS. 7 and 8. Auxiliary link 234 provides clearance between handle 214 and hook 212 to allow handle 214 to be formed with a varying contour, as suggested in FIG. 7, to match with an outer contour of the component that latch mechanism 210 is attached to.

Figures 9, 10, 11:
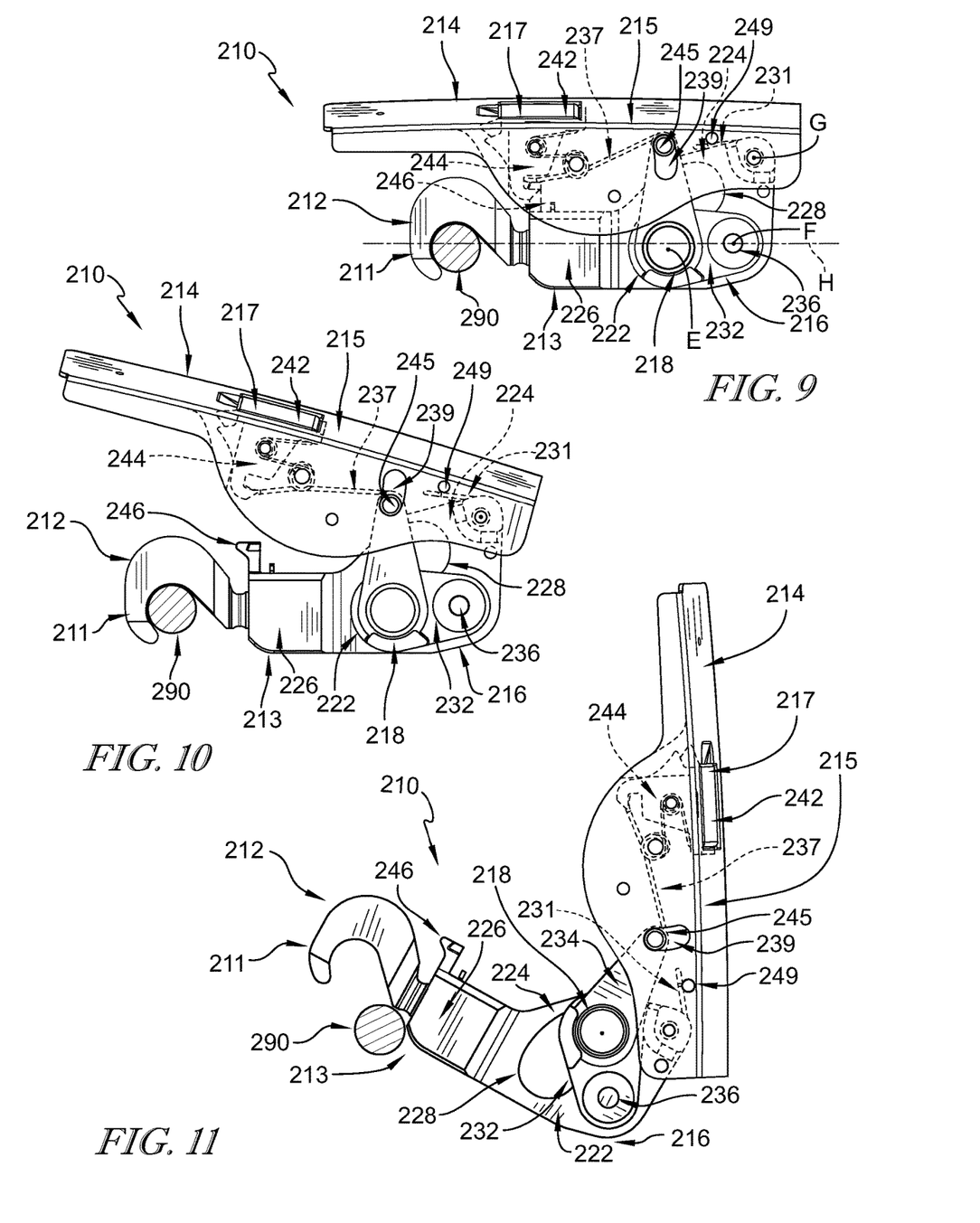
FIG. 9 is a side elevational view of the latch mechanism of FIG. 7 showing the hook engaged with a keeper and suggesting that the latch mechanism blocks movement of the keeper when the latch mechanism is in a locked position.
FIG. 10 is a view similar to FIG. 9 showing the handle moved from the closed position toward the opened position after a trigger of the handle is disengaged from the hook.
FIG. 11 is a view similar to FIG. 10 showing the handle moved to the opened position to disengage the hook from the keeper.

Handle 214 and linkage 216 control movement of hook 212 relative to a keeper 290 mounted on an adjacent component to the component that latch mechanism 210 is mounted to as suggested in FIGS. 9-10. Latch mechanism 210 is configured to block movement of keeper 290 away from mounting bushing 218 when latch mechanism 210 is in the closed position to hold adjacent components, such as panels of an aircraft, together at the selection of a user.

Latch mechanism 210 is shown in a locked position in FIG. 9. Handle 214 includes a frame 215 and a trigger 217 coupled to frame 215. Auxiliary link 234 engages with bushing 218 to hold bushing against arm 222 in slot 228 when handle 214 is in the locked position. Linkage 216 cooperates with hook 212 to provide an over-center arrangement where axis E through bushing 218 is offset from a centerline H (extending through axis F and keeper 290) toward arm 222.

Trigger 217 includes a button pad 242 and a catch 244 as shown in FIG. 9. Catch 244 engages with a retainer 246 coupled to hook body 213 to hold handle 214 in the closed position at the selection of a user. A user engages pad 242 to rotate trigger 217 relative to frame 215 such that catch 244 moves away from retainer 246 to disengage catch 244 from retainer 246.

A pop-up spring 237 engages with retainer 246 to rotate handle 214 about axis G when catch 244 is released from retainer 246 as suggested in FIG. 10. A rivet 245 extends through an oblong opening 239 formed in handle 214 and through auxiliary link 234. Opening 239 is configured to allow handle 214 to rotate from the locked position, shown in FIG. 9, to a pop-up position, shown in FIG. 10, without moving bushing 218 within slot 228. A user rotates handle 214 about axis G toward an opened position to move latch mechanism 210 to an unlocked position where hook end 211 is disengaged from keeper 290 to allow movement of keeper 290 as suggested in FIG. 11. As handle 214 rotates, bushing 218 moves in slot 228 and linkage 216 moves hook 212 relative to keeper 290. In the illustrative embodiment, a spring 231 engages with a stiffening post 249 to bias handle 214 toward the opened position to assist a user in unlocking latch mechanism 210.

Figure 12:
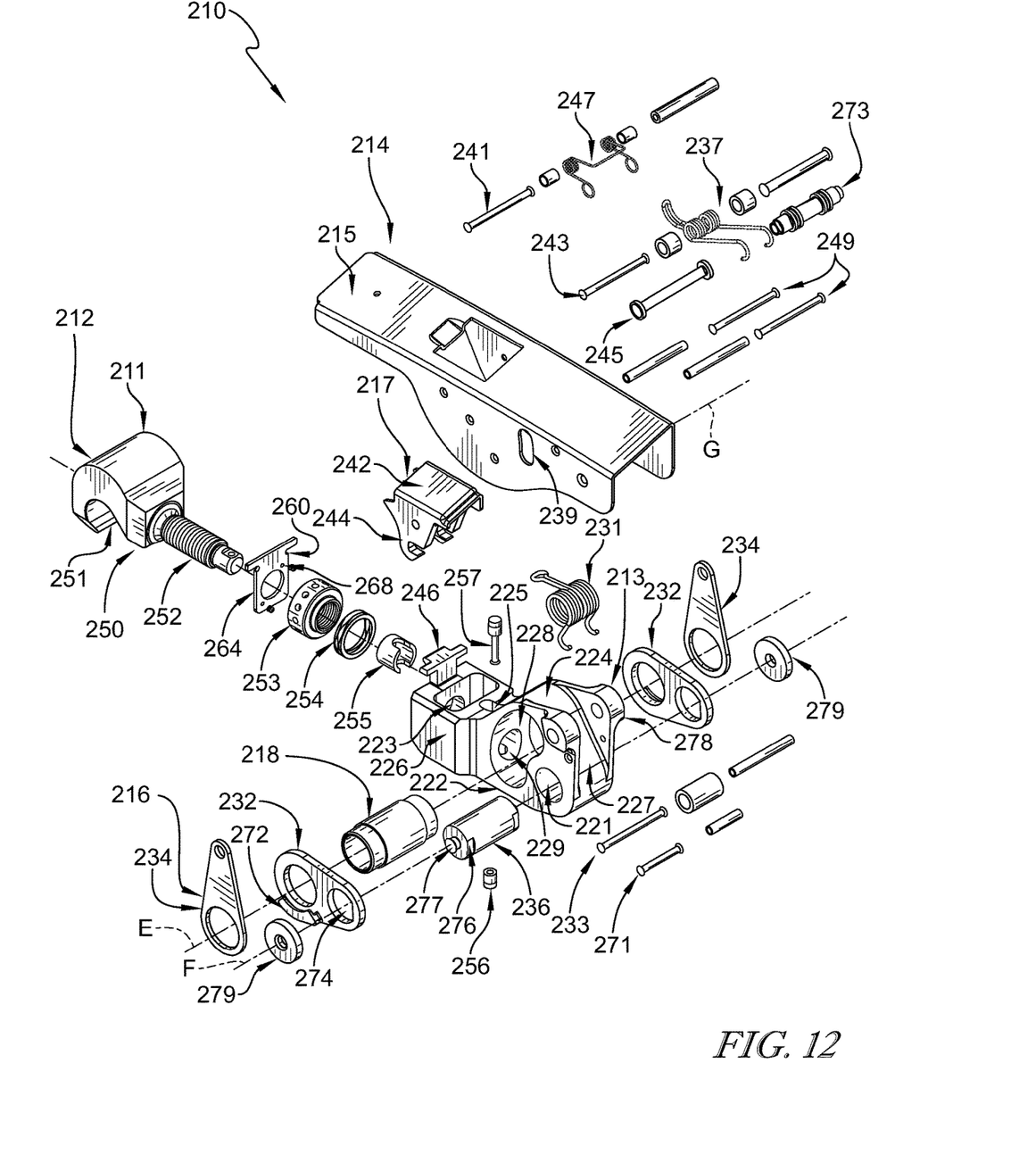
FIG. 12 is an exploded perspective view of the latch mechanism of FIG. 7.

An exploded assembly view of latch mechanism 210 is shown in FIG. 12. In the illustrative embodiment, linkage 216 includes load links 232 and auxiliary links 234 positioned on opposing sides of hook body 213. Bushing 218 extends into slot 228 and links 232, 234 engage with bushing 218 along axis E. Each load link 232 is formed to define a raceway 272 configured to receive auxiliary link 234 to block separation of links 232, 234 when latch mechanism 210 is assembled.

Rivet 236 extends through a hole 221 formed through hook body 213 and engages with links 232, 234 along axis F to mount links 232, 234 for rotation about axis F as suggested in FIG. 12. In the illustrative embodiment, each load link 232 is formed to define a shoulder 274 and rivet 236 is formed to define flats 276 configured to engage with shoulders 274 for co-rotation of load link 232 with rivet 236. In some embodiments, end caps 279 engage with pins 277 extending from rivet 236 to hold load link 232 on rivet 236.

A rivet 233 extends through frame 215 and through hook body 213 to mount handle 214 on hook 212 for rotation about axis G as suggested in FIG. 12. Spring 231 extends into a channel 227 of hook body 213 and rivet 233 couples spring 231 to hook body 213. Posts 249 extend through handle 214 and a rivet 271 extends through hook body 213. Spring 231 engages with rivet 271 and a closest one of posts 249 to bias handle 214 toward the opened position. In the illustrative embodiment, hook body 213 is formed to define spacers 278 that engage with handle 214 to block lateral movement of handle 214 relative to hook 212.

Trigger 217 is coupled to frame 215 by a rivet 241 as suggested in FIG. 12. A spring 247 is mounted on rivet 241 and engages with pad 242 and a rivet 243 to bias catch 244 toward retainer 246. Rivet 243 is also configured to mount pop-up spring 237 on handle 214. Rivet 245 extends through a sleeve 273 that engages with pop-up spring 237. In some embodiments, sleeve 273 is a straight cylinder with no engaging features on an exterior surface thereof.

Adjustable hook end 211 includes a head 250 and an adjuster 253 as shown in FIG. 12. Head 250 includes a grip 251 and a shaft 252 extending from grip 251. In the illustrative embodiment, shaft 252 is threaded and adjuster 253 engages with shaft 252 to move head 250 relative to hook body 213 when adjuster 253 is rotated. Adjuster 253 is received in a pocket 223 and shaft 252 extends into a bore 229 formed in hook body 213 to engage with adjuster 253. In some embodiments, hook end 211 is fixed relative to hook body 213 and not adjustable. In some embodiments, the position of keeper 290 is adjustable.

A pin 257 extends into a passage 225 of hook body 213 to engage with shaft 252 of head 250 as suggested in FIG. 12. A cap 256 engages with pin 257 to secure pin 257 to shaft 252. A cup 255 extends over an end of shaft 252 and engages with pin 257 and cap 256. Pin 257 and cap 256 move in passage 225 as head 250 is adjusted and are configured to limit travel of head 250 relative to hook body 213. Pin 257 and cap 256 engage with shaft 252 and hook-end receiver 226 to block rotation of head 250.

A spring assembly 260 and a spring washer 254 extend into pocket 223 with adjuster 253 as suggested in FIG. 12. Spring assembly 260 includes a mounting plate 264 and contacts 268 coupled to plate 264. In the illustrative embodiment, spring washer 254 engages with hook body 213 to bias adjuster 253 toward contacts 268 of mounting plate 264. Contacts 268 control rotation of adjuster 253.

In illustrative embodiments, a latch mechanism 10 includes a hook 12 and a linkage connection 16 operatively associated with the hook 12 and a handle 14. A hook end 11 adjustably extends from a body 13 of the hook 12. A trigger assembly 17 is operatively coupled to the handle 14 and engages with a portion of the body 13 to retain the handle 14 in a latched position as shown in FIG. 1. The linkage assembly 16 includes a load link 32 and an auxiliary link 34. A first end of the load link 32 is pivotally coupled to the body 13 by means of a body bushing 38 and rivet 36 assembly. A second end of the load link 32 and a corresponding second end of the auxiliary link 34 are operatively associated with the body 13 by a mounting bushing 18 that extends through a retaining opening 28 in the body 13. A first end of the auxiliary link 34 is pivotally coupled to a side flange of the handle 14 by a link rivet 45. It should be noted that the linkage as provided on both sides of the body so that there are symmetric linkage assemblies on both sides of the body. While only the near side of the body 22 has been described, the other side or far side shown in other Figures includes the same components connected in the same way to provide symmetric operation of the latch mechanism 10.

In illustrative embodiments, the opening 28 of the body 13 is a relatively large passage having a generally partially arcuate shape. The arcuate shape is generally radially positioned from an axis B of the rivet 36. The mounting bushing 18 extends along a central axis A that travels through the passage 28 a generally consistent distance from the axis B throughout the range of travel. The first end of the auxiliary link 34 includes an elongated slot 39 providing some range of motion for movement of the rivet 45 attached to the handle 14. This range of motion helps the linkage 16 to be engaged in an over-center condition when the latch 10 is locked. This also provides some degree of travel of the handle 14 when the trigger 17 is actuated.

In illustrative embodiments, the latch mechanism 10 is shown in the open condition in FIG. 2. The auxiliary link 34 is shown with and embossed portion in the material between the first and second ends. The embossed portion is formed in the otherwise generally planar material of the auxiliary link 34 to provide additional strength without additional weight. The elongated embossed portion extends generally parallel to the orientation to the elongated slots 39 and aligned with the central axis A to greatly increase the strength of the auxiliary link 34 along the line of force when the linkage 16 is in compression during a locking action. Similarly, it provides enhanced strengthening of the link 34 in tension during an unlocking action. The embossed portion increases strength by providing a surface deformity but also by work strengthening material by the deforming process. This additional structural feature eliminates the need to provide thicker, heavier, or more expensive material for the same link. This is useful since the relatively high offset of the handle 14 from the body 13 requires additional material and extended structures to accomplish its latching function.

In illustrative embodiments, the high offset is defined by the parameters of the surrounding envelope, locking structure, and surface contour of the structure in which the latch mechanism 10 is installed. The present disclosure shows that the difficult problem of matching a contour profile of the surrounding structure can be solved through additional features that provide unique functions to achieve the goals and overcome the problems associated with this environment. The body 13 includes a pair of extending flanges which provide spaced away mounting points for the handle 14 that is attached thereto with a rivet 33.

In illustrative embodiments, a double torsion handle spring 31 is carried on the body 13 independent arms engaged against corresponding portions of the handle 14. The independent arms allow for independent engagement of each arm against the inside surface of the handle 14. This is useful because the handle 14, as shown in the Figures, is not a direct symmetric design. In other words, the handle 14 has an asymmetric configuration to accommodate a contour associated with the component to which it is attached. It can be seen that a first flange of the handle 14 has a different side dimension than a second flange of the handle 14, which has a larger corresponding side dimension. This allows the latch mechanism 10 to be housed in a generally orthogonal envelope and allows the handle 14 to be the component that accommodates the variation in the corresponding surface through which the handle 14 is positioned. In other words, the handle 14 accommodates the overall contour and structure of a panel, for example, through which an opening is formed and the handle 14 is flush mounted or flush positioned. As a result, both arms of the spring 31 transfer spring energy to the handle to pop the handle into the upward position when the trigger is disengaged. The double torsion handle spring 31 also may be designed to provide slightly greater force on one arm than the other to try to balance and equalize the overall force on the handle 14.

In illustrative embodiments, a trigger spring 47 and a pop-up spring 37 can also be made as double torsion springs similar to handle spring 31. As shown for example in FIG. 2, the end of pop-up spring 37 is slightly curved upwardly to provide a degree of arcuate form to prevent the end from being inadvertently caught against another structure such as retainer 46. When the latch mechanism 10 is in the open position and being closed, the handle 14 is moved towards the hook 12. The pop-up spring 37 and handle spring 31 bias the handle 14 toward the open position and hold the handle 14 in the pop-up or open position until the trigger 17 is engaged with the retainer 46. This is useful to hold the handle 14 in an exposed or visually disengaged position to provide a visual flag that the latch mechanism 10 is not in the completely closed position.

In illustrative embodiments, the hook end 11 includes a grip 51 and a shaft 52 that extends through a shaft passage 29 in the hook body 13. The shaft 52 includes threads that are engaged by an adjustment nut 53 retained in a nut pocket 23. The nut pocket 23 retains the nut 53 against horizontal movement along the passage 29 and provides rotary movement of the nut 53 to advance or retract the shaft 52 by engagement of the threads with corresponding threads inside the nut 53. The threaded shaft 52 provides controllable and retainable adjustment of the hook end 11 relative to the hook body 13. A detent component 60 has engageable detent structures that engage corresponding detent recesses on the nut 53 to retain the nut 53 in a selected adjustment. A sleeve 55 is provided in the shaft 52 to facilitate movement of the shaft 52 through the passage 29. A wave spring 54 is provided to provide some end load on the adjustment nut 53 retained in the pocket 23 and to retain the detent structures in engagement. The sleeve 55 axially inserts or telescopes through the wave spring 54 and a portion of the adjustment nut 53 to provide engagement within the pocket 23. A step rivet 57 is provided to extend through notches in the sleeve 55 and engage a hole 25 to retain the assembly against removal from pocket 23.

In illustrative embodiments, the latch mechanism 10 is used to retain components of a structure such as an aircraft having movable or removable components which can be retained in a closed or attached position by use of the latch mechanism 10. The hook 12 of this latch mechanism 10 engages a keeper 90 on the opposing component to provide a mechanical structural connection between the two components. When the latch mechanism 10 is disengaged or actuated to the opened position, the hook 12 can be disengaged from the keeper 90 to allow the structures to be disengaged.

In illustrative embodiments, the handle 14 is in a downward or locked position and the linkage 16 is in an over center condition to retain the latch mechanism 10 is a locked state as suggested in FIG. 3. In this closed position, the trigger 17 is engaged with the retainer 46. In this locked position the mounting bushing 18 is in the downward most position in the partially arcuate elongated opening 28. Additionally, the handle spring 31 is in a compressed state with the arms being biased against an inside surface of the handle 14. The second end of the handle spring 31 is biased against a surface between the flanges of the hook body 13.

In illustrative embodiments, the trigger 17 is actuated by pressing on a portion of the trigger button 42 marked "push" resulting in operating against the biasing force of the spring 47 to pivot the arms 44 about the corresponding rivet 41 to facilitate disengagement of the latch mechanism 10. The pop-up spring 37 forces the handle 14 away from the hook body 13 and though the opening to allow an operator to grasp an extending portion of the handle 14. The handle 14 is pivotable about the pivot point C extending through the spring rivet 33. The high offset provided by structure of the latch mechanism helps to minimize the sweep envelop or the space needed to allow the handle 14 to move. As the handle 14 is operated into the fully opened position, the links 32, 34 are placed in tension with the rivet 45 moving into the upward position in the slot 39 of the auxiliary link 34. Pulling or tension forces in the auxiliary link 34 are distributed over the link body that is strengthened because of the embossed portion. The handle 14 is moved downwardly to reengage the latch mechanism 10 and the hook 12 engages the corresponding keeper 90. Continued movement of the handle 14 downwardly causes the links 32, 34 to articulate and the rivet 45 moves from the upward position into a downward position in the slot 39 causing the axis A of the mounting bushing 18 to shift slightly below the centerline D, resulting in an over-center condition to help retain the latch mechanism 10 in a locked position.

In illustrative embodiments, where high profile handle contour is needed, auxiliary links are used in combination with load links in a latch mechanism. The auxiliary links transfer handle motion to the load links and mounting bushing to open and close the latch mechanism. These links eliminate the oversized handle shape due to the high offset from the mounting bushing to the handle pivot point. This also simplifies and reduces the manufacturing cost, envelope, and weight. The handle sweep envelope is also minimized.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A latch mechanism comprising:
a hook including a hook body and a hook end coupled to the hook body,
a handle coupled to the hook body for rotation relative to the hook body about a first axis between a closed position where the handle extends along the hook and an opened position where the handle is spaced apart from the hook end,
a linkage, and
a bushing configured to allow mounting of the latch mechanism on a structure and to allow rotation of the latch mechanism relative to the structure about a second axis spaced apart from the first axis,
wherein the linkage includes a load link and an auxiliary link, the load link is coupled to the mounting bushing and to the hook body for rotation relative to the hook body about a third axis spaced apart from the first and second rotation axes, the hook body is formed to define an arcuate slot, the bushing extends into the arcuate slot and is configured to move along the arcuate slot around the third axis with the load link, the auxiliary link is coupled to the mounting bushing and to the handle, and the handle is configured to engage with the auxiliary link to move the mounting bushing and rotate the load link for extension and retraction of the hook end relative to the second axis.

2. The latch mechanism of claim 1, wherein the handle includes a frame and a trigger coupled to the frame, and wherein the trigger engages with a retainer of the hook body to hold the handle in the closed position at the selection of a user.

3. The latch mechanism of claim 2, further comprising a handle spring configured to engage with the handle and the hook body to bias the handle toward the opened position.

4. The latch mechanism of claim 3, further comprising a pop-up spring configured to engage with the handle and the retainer to bias the handle toward the opened position.

5. The latch mechanism of claim 1, wherein the handle is formed to define an asymmetric contour across the hook.

6. The latch mechanism of claim 1, wherein the auxiliary link is formed to include a slot, and wherein a fastener extends through the handle and through the slot to allow the handle to move from the closed position to a pop-up position spaced apart from the closed position without moving the mounting bushing relative to the hook.

7. The latch mechanism of claim 1, wherein the handle is formed to include a slot, and wherein a fastener extends through the slot of the handle and through the auxiliary link to allow the handle to move from the closed position to a pop-up position spaced apart from the closed position without moving the mounting bushing relative to the hook.

8. The latch mechanism of claim 1, wherein the load link is formed to define a raceway configured to receive the auxiliary link to block separation of auxiliary link from the load link.

9. The latch mechanism of claim 1, further comprising a fastener coupled to the hook body along the third axis and coupled to the load link.

10. The latch mechanism of claim 9, wherein the fastener is formed to define a flat, and wherein the load link is formed to define a shoulder configured to engage with the flat of the fastener to allow co-rotation of the load link and fastener about the third axis.

11. The latch mechanism of claim 9, further comprising an end cap, and wherein a pin extends from the fastener along the third axis to engage with the end cap to trap the load link between the end cap and the fastener.

12. A latch mechanism for retaining a first structure against a second structure, the latch mechanism comprising:
- a hook including a hook body and a hook end coupled to the hook body, the hook end configured to engage with a keeper of the first structure,
- a handle coupled to the hook body for rotation relative to the hook body about a first axis between a closed position where the handle extends along the hook and an opened position where the handle is spaced apart from the hook end,
- a linkage, and
- a bushing configured to allow mounting of the latch mechanism on the second structure and to allow rotation of the latch mechanism relative to the second structure about a second axis spaced apart from the first axis,
- wherein the linkage includes a load link and an auxiliary link, the load link is coupled to the mounting bushing and to the hook body for rotation relative to the hook body about a third axis spaced apart from the first and second rotation axes, the hook body is formed to define an arcuate slot, the bushing extends into the arcuate slot and is configured to move along the arcuate slot around the third axis with the load link, the auxiliary link is coupled to the mounting bushing and to the handle, and the handle is configured to engage with the auxiliary link to move the mounting bushing and rotate the load link for extension and retraction of the hook end relative to the second axis.

13. The latch mechanism of claim 12, wherein the handle is formed to define an asymmetric contour across the hook.

14. The latch mechanism of claim 12, wherein the auxiliary link is formed to include a slot, and wherein a fastener extends through the handle and through the slot to allow the handle to move from the closed position to a pop-up position spaced apart from the closed position without moving the mounting bushing relative to the hook.

15. The latch mechanism of claim 12, wherein the handle is formed to include a slot, and wherein a fastener extends through the slot of the handle and through the auxiliary link to allow the handle to move from the closed position to a pop-up position spaced apart from the closed position without moving the mounting bushing relative to the hook.

16. The latch mechanism of claim 12, wherein the load link is formed to define a raceway configured to receive the auxiliary link to block separation of auxiliary link from the load link.

17. The latch mechanism of claim 12, further comprising a fastener coupled to the hook body along the third axis and coupled to the load link.

18. The latch mechanism of claim 17, wherein the fastener is formed to define a flat, and wherein the load link is formed to define a shoulder configured to engage with the flat of the fastener to allow co-rotation of the load link and fastener about the third axis.

19. The latch mechanism of claim 17, further comprising an end cap, and wherein a pin extends from the fastener along the third axis to engage with the end cap to trap the load link between the end cap and the fastener.

\* \* \* \* \*